(12) United States Patent
Shatsky (10) Patent No.: US 8,955,089 B2
(45) Date of Patent: Feb. 10, 2015

(54) "PUSH" KEEP-ALIVE MECHANISM FOR SIP USER AGENTS LOCATED BEHIND NATS/FIREWALLS (75) Inventor: Alexander Shatsky, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 165 days.

(21) Appl. No.: 12/963,278

(22) Filed: Dec. 8, 2010

(65) Prior Publication Data
US 2012/0151571 A1  Jun. 14, 2012

(51) Int. Cl.
| | |
|---|---|
| *G06F 15/16* | (2006.01) |
| *H04L 29/06* | (2006.01) |
| *H04L 29/12* | (2006.01) |
| *H04W 12/00* | (2009.01) |
| *H04W 4/14* | (2009.01) |

(52) U.S. Cl.
CPC ............ *H04L 63/0227* (2013.01); *H04W 4/14* (2013.01); *H04L 65/1006* (2013.01); *H04L 61/2564* (2013.01); *H04L 61/2553* (2013.01); *H04L 61/2578* (2013.01); *H04W 12/00* (2013.01)
USPC .............................................. 726/11; 726/13

(58) Field of Classification Search
CPC ............ H04L 63/0227; H04L 61/2578; H04L 61/2553; H04L 61/2564; H04L 65/1006; H04W 4/14; H04W 12/00
USPC ........................ 726/11, 13; 709/226, 227, 206
See application file for complete search history.

(56) References Cited

U.S. PATENT DOCUMENTS

| | | | |
|---|---|---|---|
| 7,751,387 B2 | 7/2010 | Hwang et al. | |
| 2008/0062978 A1 | 3/2008 | Hwang et al. | |
| 2008/0123685 A1* | 5/2008 | Varma et al. | 370/466 |
| 2008/0148379 A1 | 6/2008 | Xu et al. | |

FOREIGN PATENT DOCUMENTS

WO   2008004153 A2   1/2008

OTHER PUBLICATIONS

Extended European Search Report; EP Application No. 10194164.9; Apr. 20, 2011; 7 pages.
3GPP TS 24.294 V9.3.0; 3rd Generation Partnership Project; Technical Specification Group Core Network and Terminals; IP Multimedia Subsystem (IMS) Centralized Services (ICS); Protocol via I1 Interface; Release 9; Sep. 2010; 81 pgs.
Jennings, C. et al.; "Managing Client-Initiated Connections in the Session Initiation Protocol (SIP)"; Network Working Group; RFC 5626; Oct. 2009; 51 pgs.
Rosenberg, J., et al.; "Session Traversal Utilities for NAT (STUN)"; Network Working Group; RFC 5389; Oct. 2008; 52 pgs.

(Continued)

*Primary Examiner* — Baotran N To
(74) *Attorney, Agent, or Firm* — Conley Rose, P.C.; J. Robert Brown, Jr.

(57) ABSTRACT

A user equipment (UE) and method is provided having one or more components configured to receive a non-session initiation protocol (SIP) notification from a SIP entity and in response to send a ping request to the SIP entity, the one or more components further configured to receive a SIP request from the SIP entity. A network component and method is also provided that include one or more components configured to send a non-session initiation protocol (SIP) notification to a user equipment (UE) and to receive a ping request from the UE and further to send a SIP request to the UE.

22 Claims, 5 Drawing Sheets

(56) References Cited

OTHER PUBLICATIONS

Rosenberg, J., et al.; "SIP: Session Initiation Protocol; Network Working Group"; RFC 3261; Jun. 2002; 240 pgs.
Mahy, R., et al.; "Traversal Using Relays Around NAT (TURN): Relay Extensions to Session Traversal Utilities for NAT (STUN)"; Internet Engineering Task Force (IETF); RFC 5766; Apr. 2010; 68 pgs.
Canadian Office Action; Application No. 2,760,715; Nov. 4, 2013; 3 pages.
European Communication under Rule 71(3) EPC; Application No. 10194164.9; Feb. 6, 2013; 27 pages.
Canadian Office Action; Application No. 2,760,715; Jul. 29, 2014; 2 pages.

* cited by examiner

"PUSH" KEEP-ALIVE MECHANISM FOR SIP USER AGENTS LOCATED BEHIND NATS/FIREWALLS

BACKGROUND

As used herein, the terms "user equipment" and "UE" might in some cases refer to mobile devices such as mobile telephones, mobile devices, personal digital assistants, handheld or laptop computers, and similar devices that have telecommunications capabilities. Such a UE might consist of a UE and its associated removable memory module, such as but not limited to a Universal Integrated Circuit Card (UICC) that includes a Subscriber Identity Module (SIM) application, a Universal Subscriber Identity Module (USIM) application, or a Removable User Identity Module (R-UIM) application. Alternatively, such a UE might consist of the device itself without such a module. In other cases, the term "UE" might refer to devices that have similar capabilities but that are not transportable, such as desktop computers, set-top boxes, or network appliances. The term "UE" can also refer to any hardware or software component that can terminate a communications session for a user. Also, the terms "user equipment," "UE," "user agent," "UA," "user device" and "user node" might be used synonymously herein.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In current SIP deployment schemes, for example in small office/home office (SOHO) scenarios, a SIP UE and a SIP entity (e.g. a proxy or registrar server) may be located in different networks, such as different subnets or domains, and may be separated by a NAT or a firewall. For instance, a SIP UE may be located on a private enterprise network while a SIP entity may be located on a public network, such as the Internet. The enterprise network may be protected by a firewall (with integrated NAT) from the public network.

The SIP UE and the SIP entity may be configured to initiate a SIP session or messaging flow between them and exchange SIP messages. When a period of inactivity is detected, where no SIP messages are exchanged, the NAT or firewall may be configured to block inbound messages from the SIP entity to the SIP UE. Thus, the SIP UE may still be able to send SIP messages in the direction to the SIP entity (i.e. outbound) through the NAT or firewall, but the SIP entity may be unable to send SIP messages in the reverse direction (i.e. inbound). The period of inactivity may be a configurable parameter on the firewalls/NATs. Typically, the period of inactivity may vary between about 20 and 60 seconds.

SIP NAT traversal techniques are described in the Internet Engineering Task Force (IETF) Request for Comment (RFC) 5626, entitled "Managing Client-Initiated Connections in the Session Initiation Protocol (SIP)", and the RFC 5389, entitled "Session Traversal Utilities for NAT (STUN)", both of which are incorporated herein by reference. In the RFCs, a pull keep-alive mechanism, implemented by the SIP UE, is proposed to keep the connectivity from the SIP entity to the SIP UE alive. The SIP UE may keep the connection alive by continuously pinging the NAT/firewall by sending a plurality of "empty" Carriage Return Line Feed (CRLF) TCP packets. Alternatively, the pinging may be implemented using a plurality of Simple Traversal of User Datagram Protocol (UDP) through Network Address Translators (NATs) (or STUN) packets, also referred to as a Session Traversal Utilities for NAT packets. Such a continuous pinging procedure may be inefficient, since the procedure may drain battery power on wireless devices (e.g. UEs).

Disclosed herein is a method, device, and/or system for allowing the SIP entity to initiate an outbound SIP session or messaging flow to the SIP UE after blocking the SIP port by a NAT/firewall between the SIP UE and the SIP entity. When the SIP port is blocked, the SIP entity may use a non-SIP mechanism and/or protocol to notify the SIP UE about an incoming (or inbound) SIP call, transaction, or request. The non-SIP notification may trigger the SIP UE to send a "ping" request to the SIP entity, which may be a SIP request or other message type. The ping request may open a port in the NAT/firewall and thus unblock the port for inbound SIP requests or messaging flows from the SIP entity. The non-SIP notification may also be used by the SIP entity to detect if a change in the NAT/firewall port had occurred.

Upon receiving the ping request from the SIP UE, the SIP entity may send a "real" SIP request to the SIP UE. The term "real" SIP request is used herein to indicate an actUEl SIP request message (from the SIP entity) and differentiate the actUEl SIP request message from an SIP ping request (from the SIP UE). The "real" SIP request may traverse the NAT/firewall through the same NAT/firewall port as the ping request that was sent by the SIP UE. The disclosed scheme is referred to herein as a "push" keep-alive mechanism. The push keep-alive mechanism may be more efficient than other schemes, such as the pull keep-alive mechanism, since the push keep-alive mechanism may require less battery power in some embodiments.

Figure 1:
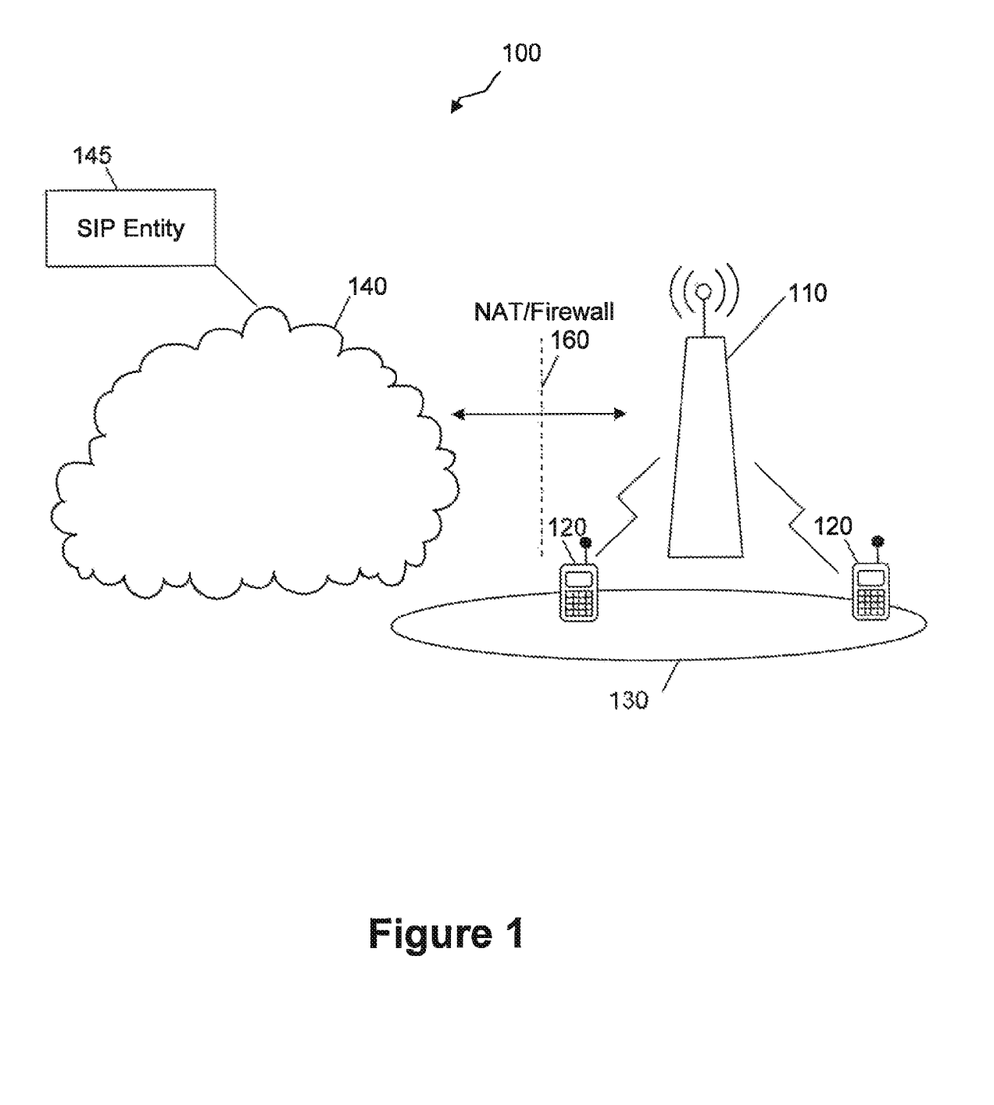
FIG. 1 is a schematic diagram of a communications system that allows a UE to communicate with at least one of other network components and devices according to an embodiment of the disclosure.

FIG. 1 illustrates an embodiment of a radio access network (RAN) 100, which may be a long-term evolution (LTE) or LTE-Advanced (LTE-A), as described in the Third Generation Partnership Project (3GPP), or other well known or after developed networks. In this example, an LTE or LTE-A system might include an Evolved Universal Terrestrial Radio Access Network (E-UTRAN) node B (or eNB), a wireless access point, or a similar component rather than a traditional base station. FIG. 1 is exemplary and may have other components or arrangements in other embodiments. In an embodiment, the RAN 100 may comprise at least one access device 110 and at least one UE 120, which may be both located within a cell 130.

As used herein, the term "access device" refers to any component of the wireless network, such as a traditional base station, a wireless access point, or an LTE or LTE-A node B or eNB, that creates a geographical area of reception and transmission coverage allowing a UE 120 or a relay node (not shown) to access or communicate with other components in a telecommunications system, such as second UE 120. In this document, the term "access node" and "access device" may be used interchangeably, but it is understood that an access node may comprise a plurality of hardware and software components.

The access device 110 may communicate with any UE 120 within the same cell 130, directly via a direct link, such as in a UTRAN. The cell 130 may be a geographical area of reception and transmission coverage. For instance, the direct link may be a point-to-point link established between the access device 110 and the UE 120 and used to transmit and receive signals between the two. Alternatively, the access devices 110 may communicate with any UE 120 in the same cell 130 over shared links, such as in an E-UTRAN. For instance, the shared links may comprise an uplink shared channel and a downlink shared channel. Additionally, the access devices 110 may communicate with other components or devices to provide for the components of the RAN 100 access to any other network 140, for instance using similar or different network protocols or technologies. In an embodiment, the UEs 120 may move about between different cells 130 and their communications may be handed-over between the different cells 130, where the UEs 120 may communicate with different access devices 110.

The UE 120 may be a SIP UE that initiates SIP sessions or messaging flows with a SIP entity 145, which may be located in the network 140, the RAN 100, or another network that may communicate with the UE 120 via the RAN 100. The SIP entity 145 may be any network entity or component capable to exchange SIP messaging flows with the UE 120, such as a SIP server, a second SIP UE, a SIP gateway, an IMS UE, an IMS Call Session Control Function (CSCF), or other SIP entities. During an active SIP session, the UE 120 and the SIP entity 145 may exchange SIP messages, such as SIP requests and responses. The UE 120 may also be located behind a NAT/firewall 160, i.e. between the UE 120 and the SIP entity 145, which may improve communications security and protect the UE 120 from network attacks. The NAT/firewall 160 may block the incoming SIP messaging flows from the SIP entity 145 to the UE 120, after a period of inactivity. For instance, the NAT/firewall may close or block a port (e.g. an interface or link) associated with the SIP messaging flows.

The SIP entity 145 and the UE 120 may be configured to implement a push keep-alive mechanism based on a non-SIP mechanism/protocol to unblock a SIP port on the NAT/firewall 160, after blocking the SIP port between the SIP entity 145 to the UE 120 by the NAT/firewall 160. In some embodiments, when the SIP entity 145 sends a message to the UE 120 and does not receive a response, after some period of time the SIP entity 145 may determine or assume that the message has been blocked and that a NAT/Firewall 160 is between the UE 120 and the SIP entity 145. In other embodiments, the SIP entity 145 might otherwise identify the existence of the NAT/ firewall 160 and communicate as described herein. The SIP entity 145 may initiate the SIP session by sending a non-SIP notification to the UE 120 behind the NAT/firewall. The non-SIP notification may indicate to the UE 120 that there is a pending SIP request from the SIP entity 145. In return, the UE 120 may send a ping request to open a port through the NAT/firewall. In some embodiments, receipt of the non-SIP notification from the SIP entity 145 might be an indicator to the UE 120 that a NAT/Firewall 160 is between the UE 120 and the SIP entity 145. In other embodiments, the UE 120 might otherwise identify the existence of the NAT/firewall 160 and communicate as described herein. When the SIP entity 145 receives the ping request, the SIP entity 145 may send the pending SIP request through the same port to the UE 120. Thus, the SIP port may be unblocked and the UE 120 may be allowed to receive SIP messaging flows from the SIP entity 145 through the NAT/firewall 160 port.

The non-SIP notification that is used by the SIP entity 145 and the UE 120 to unblock the SIP port may be based on cellular network technologies. For instance, the non-SIP notification may be sent using Short Message Service (SMS), Unstructured Supplementary Service Data (USSD), or Internet Protocol (IP) Multimedia Subsystem (IMS) Centralized Services (ICS) protocol via 11 interface, as described in 3GPP TS 24.294. Alternatively, the non-SIP notification may be based on Research in Motion (RIM) developed technologies, such as a Blackberry (BB) infrastructure protocols. Such non-SIP notification may bypass or process through the NAT/ firewall 160, as described below, or may go through an open NAT/firewall 160 port and reach the UE 120 behind it. Some of the different non-SIP notifications that may be used are described in detail below.

The ping request used by the UE 120 to unblock the NAT/ firewall 160 port may be a SIP ping request. The SIP ping request may correspond to an SIP request message type, such as but not limited to a SIP OPTIONS, REGISTER, SUBSCRIBE, INFO, NOTIFY, MESSAGE, INVITE, or other SIP message types. The SIP ping request may be an outbound SIP message that is allowed through the NAT/firewall. Alternatively, the ping request may be a non-SIP message, an IP message, a Hypertext Transfer Protocol (HTTP) message, or any other suitable non-SIP protocol message. The non-SIP ping request message may be sent through the NAT/firewall.

In one embodiment, the non-SIP notification mechanism may be based on SMS technology. As such, the non-SIP notification may be sent in a SMS message to the UE 120 via an Internet Protocol or IP-cellular interface, for example similar to a web-SMS service. As such, the SMS message may be sent on a different communication path than the path between the UE 120 and the SIP entity 145, and thus may bypass the NAT/firewall 160 between the UE 120 and the SIP entity 145. When the UE 120 is connected to the cellular network, for example the RAN 100, the SIP entity 145 may acquire the UE identity (e.g. mobile phone number). The SIP entity 145 may then send the SMS message to the UE 120 using the UE's identity. The SMS message may comprise a "SIP notification" that alerts the UE 120 of an incoming call or transaction.

In another embodiment, the non-SIP notification mechanism may be based on USSD technology available in the network. The non-SIP notification may be sent in a USSD packet on a different communication path than the path between the UE 120 and the SIP entity 145, and thus may bypass the NAT/firewall 160 between the UE 120 and the SIP entity 145. The USSD packet may comprise the "SIP notification" that alerts the UE 120 to the incoming call or transaction. Since the SMS and USSD are non-SIP protocols, both the SMS and USSD non-SIP notifications may not be affected by the NAT/firewall blocking of the inbound SIP messaging flows and may reach the UE 120 behind the NAT/firewall.

In another embodiment, the non-SIP notification mechanism may be based on the RIM BB infrastructure protocols. Accordingly, the SIP entity 145 may be provided with a Blackberry PIN and possibly other RIM-proprietary information needed to identify the UE 120. The non-SIP notification may be sent in a "PIN message" using the BB infrastructure. The RIM protocols and/or the NAT/firewall 160 may be configured to allow the non-SIP notification message to pass or go through the NAT/firewall 160 between the UE 120 and the SIP entity 145 without being blocked by the NAT/firewall 160. The PIN message may comprise the "SIP notification" that alerts the UE 120 about the incoming call or transaction. The SIP entity 145 may be configured to communicate with a BB relay infrastructure, which may also communicate with the UE 120. The BB relay access may be configured to communicate with one or more SIP entities in a protected manner. For instance, the BB relay may maintain a list of trusted or legitimate SIP entities that are allowed to notify BB devices (e.g. the UE 120) via the BB relay. The BB relay may also be configured based on other security measures or features to ensure secured access by authorized SIP entities to the UE 120. The BB relay may encapsulate the "SIP notification" from the SIP entity 145 in a PIN message, which reaches the UE 120 behind the NAT/firewall.

In another embodiment, the non-SIP mechanism may be based on IMS I1protocol, where the SIP entity 145 may be coupled to the cellular or mobile network's IMS system. The IMS I1 protocol is described in the 3GPP Technical Specification (TS) 24.294, which is incorporated herein by reference. Accordingly, the I1 protocol interface may be extended to allow the SIP entity 145 to send a notification to alert the UE 120 of an incoming call or SIP message. The notification sent via the I1 protocol interface may reach the UE 120 behind the NAT/firewall. The notification may be sent on a different communication path or interface than the path between the UE 120 and the SIP entity 145, and thus may bypass the NAT/firewall 160 between the UE 120 and the SIP entity 145.

In other embodiments, other technologies and/or protocols may be used to provide the non-SIP notification from the SIP entity 145 to the UE 120 behind the NAT/server, such as using HTTP. The HTTP and/or the NAT/firewall 160 may be configured to allow the non-SIP notification message to pass or go through the NAT/firewall 160 between the UE 120 and the SIP entity 145 without being blocked by the NAT/firewall 160.

Figure 2:
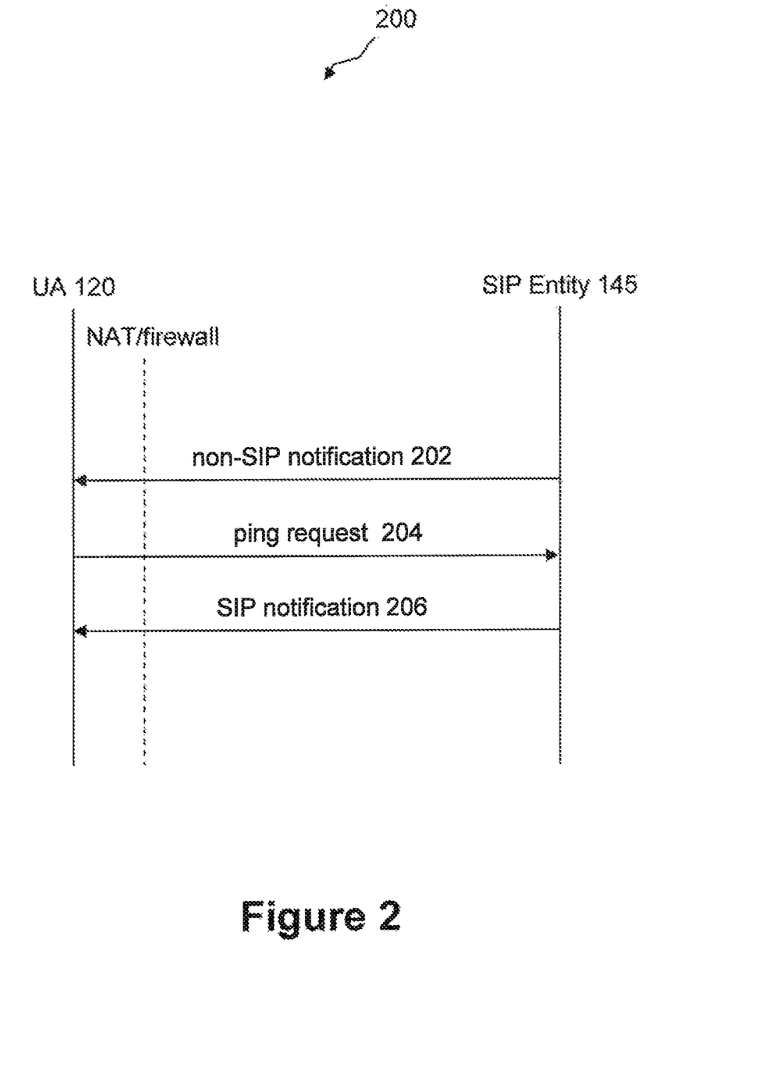
FIG. 2 is a protocol diagram of a signaling scheme between a UE and a session initiation protocol (SIP) server to activate a SIP session according to an embodiment of the disclosure.

FIG. 2 illustrates a signaling scheme 200 between a UE 120 and a SIP entity 145 to activate a SIP session, for example after the SIP messaging flows have been blocked by the NAT/firewall between the SIP entity 145 and the UE 120. The signaling scheme 200 may be based on the non-SIP notification mechanism/protocol described above. First, the SIP entity 145 may detect an incoming call or transaction directed to the UE 120. The SIP entity 145 may then send a non-SIP notification 202 to the UE 120 behind the NAT/firewall. The non-SIP notification 202 may be based on a non-SIP technology, such as SMS, USSD, RIM protocols, HTTP, or other cellular or IP technologies. The non-SIP notification 202 may comprise an encapsulated "SIP notification" that indicates to the UE 120 an incoming SIP request.

Upon receiving the non-SIP notification 202, the UE 120 may send a ping request 204 through a NAT/firewall port to the SIP entity 145. The ping request 204 may be a SIP ping request (e.g. OPTIONS, REGISTER, SUBSCRIBE, INFO, INVITE, MESSAGE, NOTIFY) or a non-SIP ping request (e.g. HTTP). The NAT/firewall may then activate the port (for inbound or incoming SIP messages) and forward the ping request 204 to the SIP entity 145. When the SIP entity 145 receives the ping request, the SIP entity 145 may detect that the SIP port has been reactivated. The SIP entity 145 may then send a real SIP request 206 to the UE 120 through the same NAT/firewall port. The real SIP request 206 may begin the SIP messaging flows between the SIP entity 145 and the UE 120.

Figure 3:
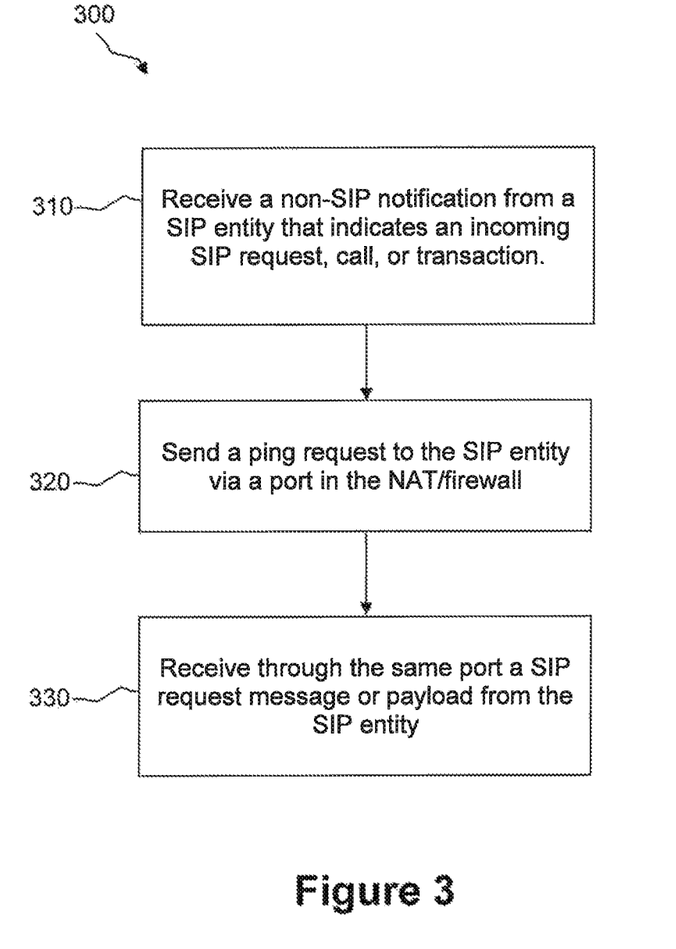
FIG. 3 is a flowchart of a method for unblocking a network address translator (NAT) or firewall between a UE and a SIP entity according to an embodiment of the disclosure.

FIG. 3 illustrates an embodiment of a method 300 for unblocking a NAT/firewall and reactivating a SIP messaging flow between the SIP entity 145 and the UE 120. The method 300 may be implemented by the UE 120. At step 310, the UE 120 may receive a non-SIP notification from the SIP entity 145 that indicates an incoming SIP request, call, or transaction. At block 320, the UE 120 may send a ping request to the SIP entity 145, which may be forwarded via a port in the NAT/firewall. At block 330, the UE 120 may receive through the same port a SIP request message or payload from the SIP entity 145, which may initiate the activated SIP session.

Figure 4:
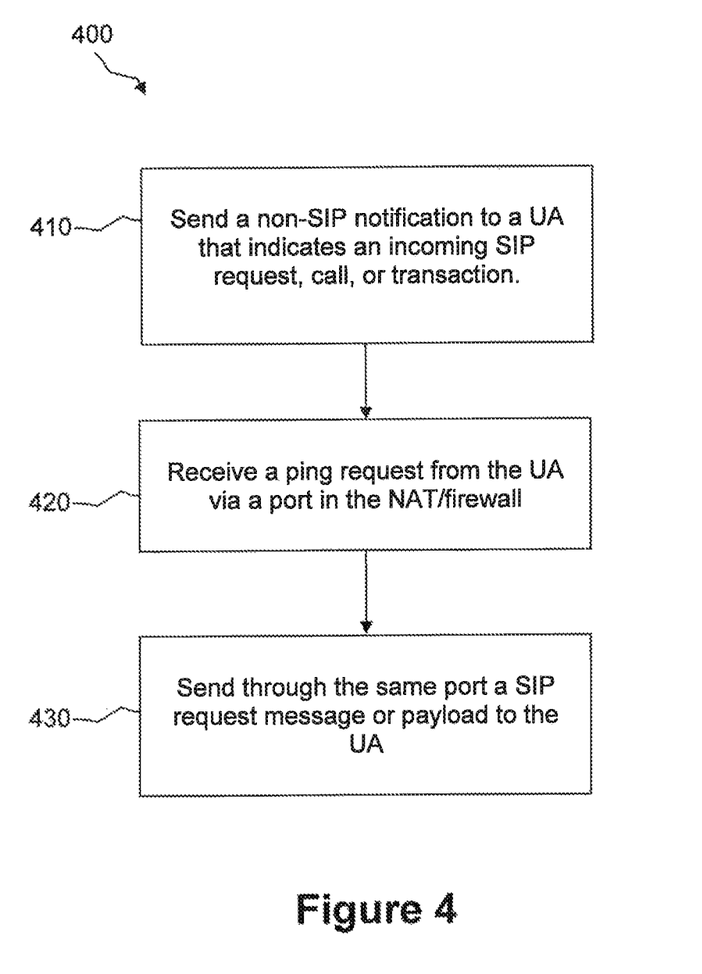
FIG. 4 is a flowchart of another method for unblocking a NAT or firewall between a UE and a SIP entity according to an embodiment of the disclosure.

FIG. 4 illustrates an embodiment of another method 400 for unblocking a NAT/firewall to reactivate a SIP messaging flow between the SIP entity 145 and the UE 120. The method 400 may be implemented by the SIP entity 145. At step 410, the SIP entity 145 may send a non-SIP notification to the UE 120 that indicates an incoming SIP request, call, or transaction. At block 420, the SIP entity 145 may receive a ping request from the UE 120, which may be forwarded via a port in the NAT/firewall. At block 430, the SIP entity 145 may send through the same port a SIP request message or payload to the UE 120, which may initiate a SIP session. The SIP entity 145 may subsequently send a plurality of SIP messaging flows to the UE 120 through the same NAT/firewall port.

Figure 5:
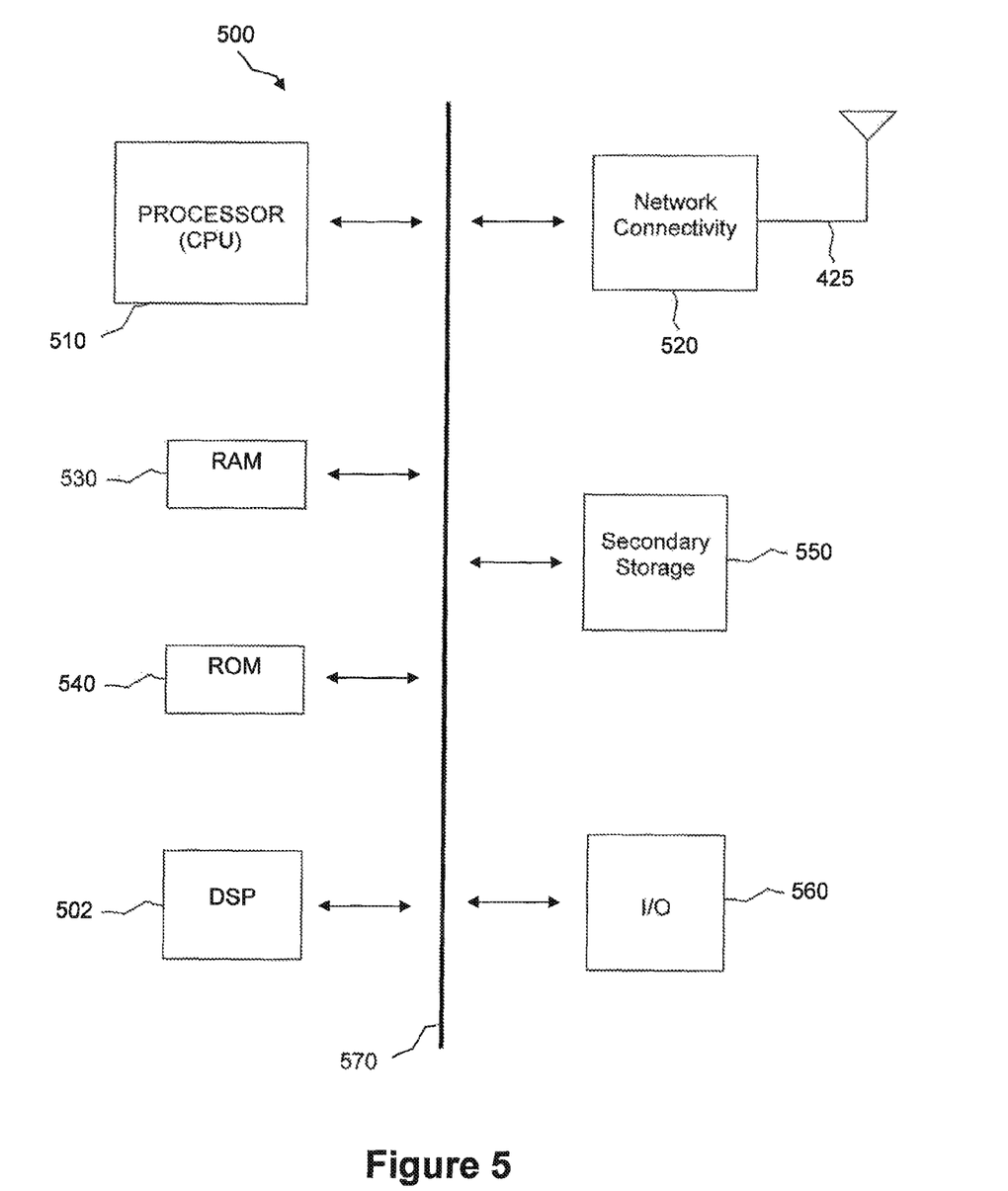
FIG. 5 illustrates a processor and related components suitable for implementing the several embodiments of the present disclosure.

The UE 120, the SIP entity 145, and other components described above might include a processing component that is capable of executing instructions related to the actions described above. FIG. 5 illustrates an example of a system 500 that includes a processing component 510 suitable for implementing one or more embodiments disclosed herein. In addition to the processor 510 (which may be referred to as a central processor unit or CPU), the system 500 might include network connectivity devices 520, random access memory (RAM) 530, read only memory (ROM) 540, secondary storage 550, and input/output (I/O) devices 560. These components might communicate with one another via a bus 570. In some cases, some of these components may not be present or may be combined in various combinations with one another or with other components not shown. These components might be located in a single physical entity or in more than one physical entity. Any actions described herein as being taken by the processor 510 might be taken by the processor 510 alone or by the processor 510 in conjunction with one or more components shown or not shown in the drawing, such as a digital signal processor (DSP) 502. Although the DSP 502 is shown as a separate component, the DSP 502 might be incorporated into the processor 510.

The processor 510 executes instructions, codes, computer programs, or scripts that it might access from the network connectivity devices 520, RAM 530, ROM 540, or secondary storage 550 (which might include various disk-based systems such as hard disk, floppy disk, or optical disk). While only one CPU 510 is shown, multiple processors may be present. Thus, while instructions may be discussed as being executed by a processor, the instructions may be executed simultaneously, serially, or otherwise by one or multiple processors. The processor 510 may be implemented as one or more CPU chips.

The network connectivity devices 520 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, GSM radio transceiver devices, worldwide interoperability for microwave access (WiMAX) devices, and/or other well-known devices for connecting to networks. These network connectivity devices 520 may enable the processor 510 to communicate with the Internet or one or more telecommunications networks or other networks from which the processor 510 might receive information or to which the processor 510 might output information. The network connectivity devices 520 might also include one or more transceiver components 525 capable of transmitting and/or receiving data wirelessly.

The RAM 530 might be used to store volatile data and perhaps to store instructions that are executed by the processor 510. The ROM 540 is a non-volatile memory device that typically has a smaller memory capacity than the memory capacity of the secondary storage 550. ROM 540 might be used to store instructions and perhaps data that are read during execution of the instructions. Access to both RAM 530 and ROM 540 is typically faster than to secondary storage 550. The secondary storage 550 is typically comprised of one or more disk drives or tape drives and might be used for non-volatile storage of data or as an over-flow data storage device if RAM 530 is not large enough to hold all working data. Secondary storage 550 may be used to store programs that are loaded into RAM 530 when such programs are selected for execution.

The I/O devices 560 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 525 might be considered to be a component of the I/O devices 560 instead of or in addition to being a component of the network connectivity devices 520.

One or various combinations of the components of the system 500, including memory, hardware, firmware, software or others may be referred to herein as a "component". Furthermore when one or more components are referred to as configured to performing some (for example) function, task, or operation, this may include one component or multiple different components performing one, all, or some combination of the functions, tasks, or operations referred to.

A user equipment (UE), comprising one or more components configured to receive a non-session initiation protocol (SIP) notification from a SIP entity and in response to send a ping request to the SIP entity, the one or more components further configured to receive a SIP request from the SIP entity.

A network component, comprising one or more components configured to send a non-session initiation protocol (SIP) notification to a user equipment (UE), the one or more components further configured and to receive a ping request from the UE and further to send a SIP request to the UE.

A method implemented on a user equipment (UE), comprising receiving a non-session initiation protocol (SIP) notification from a SIP entity; sending a ping request to the SIP entity; and receiving a SIP request from the SIP entity.

A method implemented on a session initiation protocol (SIP) entity, comprising sending a non-SIP notification to a user equipment (UE); receiving a ping request from the UE; and sending a SIP request to the UE.

In any of the above embodiments, a ping or ping request may be an example of a non-SIP notification. The ping may be a SIP request message type that is allowed through the NAT or firewall in the direction from the UE to the SIP entity and wherein the ping request is a non-SIP request message type.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE) comprising:
a microprocessor configured to:
receive a non-session initiation protocol (non-SIP) notification from a SIP entity to initiate a SIP session with the UE, wherein the non-SIP notification indicates to the UE that there is a pending SIP request from the SIP entity, wherein a network component is connected between the UE and the SIP entity, and wherein the network component is operable to block SIP messages from the SIP entity to the UE;
send a ping request to the SIP entity in response to receiving the non-SIP notification, wherein the ping request is operable to open a port on the network component to thereby allow an inbound SIP message flow to the UE through the port; and
receive a SIP request from the SIP entity through the open port,
wherein the non-SIP notification is:
received in an Unstructured Supplementary Service Data (USSD) message;
received via an IP Multimedia Subsystem (IMS) layer one (l1) protocol interface; or
received over a proprietary enterprise server,
wherein the UE is configured to implement a traversal technique to traverse a network address translator (NAT) or firewall at the network component, wherein the traversal technique is implemented using a push keep-alive mechanism based on a non-SIP protocol to unblock a SIP port on the NAT or firewall at the network component.

2. The UE of claim 1, wherein the non-SIP notification bypasses or passes through the network component.

3. The UE of claim 1, wherein the SIP entity is an SIP server, a SIP UE, a SIP gateway, an Internet Protocol (IP) Multimedia Subsystem (IMS) UE, an IMS Call Session Control Function (CSCF), or other SIP entity capable of exchanging SIP messaging flows with the UE.

4. The UE of claim 1, wherein the network component allows the incoming SIP messaging flows after blocking the SIP messaging flows due to a period of inactivity between the UE and the SIP entity.

5. The UE of claim 1, wherein the UE receives the non-SIP notification in the USSD message.

6. A network component comprising:
a microprocessor configured to:
send a non-session initiation protocol (non-SIP) notification to a user equipment (UE) to indicate that there is a pending SIP request from the network component and to initiate a SIP session with the UE, wherein a second network component is connected between the UE and the network component, and wherein the second network component is operable to block SIP messages from the SIP entity to the UE;
receive a ping request from the UE sent in response to the non-SIP notification, wherein the ping request is operable to open a port on the second network component to thereby allow an inbound SIP message flow to the UE through the port; and
send a SIP request to the UE through the open port,
wherein the non-SIP notification is:
sent to the UE in an Unstructured Supplementary Service Data (USSD) message;
sent to the UE via an IP Multimedia Subsystem (IMS) layer one (l1) protocol interface; or
sent to the UE over a proprietary enterprise server,
wherein the UE is configured to implement a traversal technique to traverse a network address translator (NAT) or firewall at the second network component, wherein the traversal technique is implemented using a push keep-alive mechanism based on a non-SIP protocol to unblock a SIP port on the NAT or firewall at the second network component.

7. The network component of claim 6, wherein the microprocessor receives the ping request from the UE via the port in the second network component.

8. The network component of claim 7, wherein the non-SIP notification bypasses or passes through the second network component.

9. The network component of claim 7, wherein the second network component allows the incoming SIP messaging flows after blocking the SIP messaging flows due to a period of inactivity between the UE and the network component.

10. The network component of claim 7, wherein the network component sends the non-SIP notification to the UE in the USSD message.

11. A method implemented on a user equipment (UE), the method comprising:
receiving a non-session initiation protocol (non-SIP) notification from a SIP entity to initiate a SIP session with the UE, wherein the non-SIP notification indicates to the UE that there is a pending SIP request from the SIP entity, wherein a network component is connected between the UE and the SIP entity, and wherein the network component is operable to block SIP messages from the SIP entity to the UE;
sending a ping request to the SIP entity in response to receiving the non-SIP notification, wherein the ping request is operable to open a port on the network component to thereby allow an inbound SIP message flow to the UE through the port; and
receiving a SIP request from the SIP entity through the open port,
wherein the non-SIP notification is:
received in an Unstructured Supplementary Service Data (USSD) message;
received via an IP Multimedia Subsystem (IMS) layer one (l1) protocol interface; or
received over a proprietary enterprise server,
wherein the UE is configured to implement a traversal technique to traverse a network address translator (NAT) or firewall at the network component, wherein the traversal technique is implemented using a push keep-alive mechanism based on a non-SIP protocol to unblock a SIP port on the NAT or firewall at the network component.

12. The method of claim 11, wherein the ping request is sent to the SIP entity via the port on the network component.

13. The method of claim 12 wherein the non-SIP notification bypasses or passes through the network component.

14. The method of claim 12, wherein the SIP entity is a SIP server, a SIP UE, a SIP gateway, an Internet Protocol (IP) Multimedia Subsystem (IMS) UE, an IMS Call Session Control Function (CSCF), or other SIP entity capable of exchanging SIP messaging flows with the UE.

15. The method of claim 11, wherein the network component allows the incoming SIP messaging flows after blocking the SIP session due to a period of inactivity between the UE and the SIP entity.

16. The method of claim 12, wherein the UE receives the non-SIP notification in the USSD message.

17. A method implemented on a session initiation protocol (SIP) entity, the method comprising:
sending a non-SIP notification to a user equipment (UE) to indicate that there is a pending SIP request from the SIP entity to initiate a SIP session with the UE, wherein a network component is connected between the UE and the SIP entity, wherein the network component is operable to block SIP messages from the SIP entity to the UE;
receiving a ping request from the UE sent in response to the non-SIP notification, wherein the ping request is operable to open a port on the network component to thereby allow an inbound SIP message flow to the UE through the port; and
sending a SIP request to the UE through the open port,
wherein the non-SIP notification is:
sent to the UE in an Unstructured Supplementary Service Data (USSD) message;
sent to the UE via an IP Multimedia Subsystem (IMS) layer one (l1) protocol interface; or
sent to the UE over a proprietary enterprise server,
wherein the UE is configured to implement a traversal technique to traverse a network address translator (NAT) or firewall at the network component, wherein the traversal technique is implemented using a push keep-alive mechanism based on a non-SIP protocol to unblock a SIP port on the NAT or firewall at the network component.

18. The method of claim 17, wherein the ping request is received from the UE via the port.

19. The method of claim 18, wherein the non-SIP notification bypasses or passes through the network component.

20. The method of claim 18, wherein the SIP entity is a SIP server, a SIP UE, a SIP gateway, an Internet Protocol (IP) Multimedia Subsystem (IMS) UE, an IMS Call Session Control Function (CSCF), or other SIP entity capable of exchanging SIP messaging flows with the UE.

21. The method of claim 18, wherein the network component allows the incoming SIP messaging flows after blocking the SIP session due to a period of inactivity between the UE and the SIP entity.

22. The method of claim 18, wherein the SIP entity sends the non-SIP notification to the UE in the USSD message.

\* \* \* \* \*